United States Patent [19]

Wojciechowski et al.

[11] Patent Number: 4,834,300
[45] Date of Patent: May 30, 1989

[54] METHOD AND APPARATUS FOR SOLID WASTE DISPOSAL

[76] Inventors: Christopher R. Wojciechowski, 2836 Roscovmare Rd.; Michael C. Wojciechowski, 3001 Antelo View Dr., both of Los Angeles, Calif. 90077

[21] Appl. No.: 164,577

[22] Filed: Mar. 7, 1988

[51] Int. Cl.⁴ ............................................. B02C 7/00
[52] U.S. Cl. ............................. 241/24; 241/257 B; 241/DIG. 38; 405/129
[58] Field of Search ............... 405/128, 129; 501/155, 501/32; 264/37, 38; 241/24, 257 G, DIG. 38

[56] References Cited

U.S. PATENT DOCUMENTS

| | | | |
|---|---|---|---|
| 3,511,056 | 5/1970 | Jones et al. | 405/129 |
| 3,675,428 | 7/1972 | Watts | 405/129 |
| 4,065,282 | 12/1977 | Morey | 501/155 X |
| 4,217,212 | 8/1980 | Deal | 405/129 X |
| 4,413,969 | 11/1983 | McDonald | 264/37 X |
| 4,692,167 | 9/1987 | Leyasseur | 264/37 X |
| 4,784,334 | 11/1988 | Van Der Veer et al. | 241/24 X |

Primary Examiner—Dennis L. Taylor
Attorney, Agent, or Firm—Blakely, Sokoloff, Taylor & Zafman

[57] ABSTRACT

The present invention contemplates a multi-level collection area of solid waste products. On a top level of the collection site, ramp ways for trucks are provided so that the trucks may dump solid waste into a central collection opening. Gravity feeds the solid waste into a centrifugal spinner. The spinner includes radial agitator blades. The solid waste is spun and agitated on the spinner and centrifugal force tends to push the solid waste to the outer edge of the spinner. The spinner angles upward from the center to an outlet slot of uniform size disposed about the circumference of the spinner. A cover is disposed over the spinner having a plurality of fixed teeth disposed thereon. The combination of the cover and spinner is such that as larger pieces of solid waste are propelled towards the outlet slots, they are acted on both by the spinner and the blades of the cover, reducing them to a size small enough to fit through the outlet opening. The continuous rotating action also aids in preventing the clogging of the outlet opening. The centrifugal force of the spinner pushes the articles through the outlet slots and into a series of collection bins. The collection bins may include screens or filters for further controlling the size of the solid waste particles. Runways are provided beneath the bins for access by trucks. An opening in the bottom of the bin is used to release the uniform size solid waste particles into the truck for transportation to a land fill site. The uniform and small size of the solid waste particles results in improved mixing characteristics with earth, thus a uniform compaction with a minimum of settlement in the land fill, increasing the likelihood that the land fill will be suitable for uses requiring load support capabilities. Moisture is removed from the processed solid waste by a combination of grinding and centrifugal force. The bottom of the storage bins is pitched and includes as sieve so that any liquid exiting the outlet slot will flow through the sieve and be transported away from solid waste. By substantially reducing the liquid content of the solid waste, the land fill volume will have fewer organic fluids and liquids, reducing the amount of leachaids and the formation of methane gas.

22 Claims, 4 Drawing Sheets

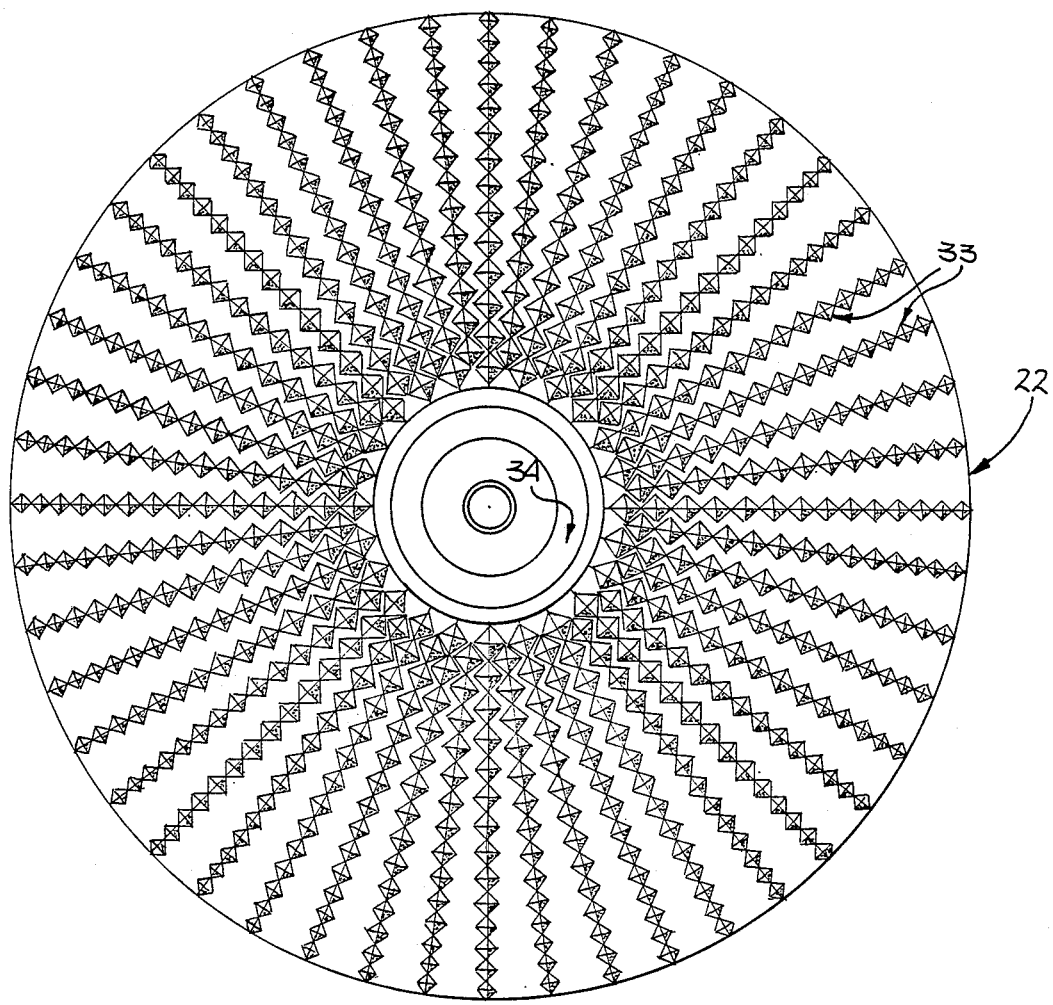
Fig. A

METHOD AND APPARATUS FOR SOLID WASTE DISPOSAL

BACKGROUND OF THE PRESENT INVENTION

1. Field of the Invention

This invention relates to the field of solid waste disposal and in particular to a method and apparatus for solid waste disposal for providing uniform size and composition fill material for use in a land fill.

2. Background Art

Large volumes of soild waste materials are generated each day. Man has been confronted with this problem since the beginning. In today's society, which is sometimes called "our disposable society", we are responsible for disposing more waste per capita per year than at any previous time in history.

The current methods of dealing with refuse are landfills, recycling and reclamation. Our ability to reclaim and recycle waste products is responsible for a small percentage of total refuse produced, the majority of which is thrown away, picked up by garbage trucks, then taken to a landfill where it is buried permanently with an earth cover. In some countries, the "garbage" is burned in incinerators.

At present, these methods are problematic, as they are sources of major pollution to our environment, negatively affecting the health of human beings and other species on this planet. By the adaptation of this invention, both the landfill method and the incineration method will result in fewer pollutants entering man's environment.

Waste disposal in present day landfills is a combination of refuse from garbage trucks, containers from construction projects, backyard do-it-yourself projects, gardening waste, earth disposal and broken asphalt, concrete, lumber, etc., from the demolition or the remodeling of buildings. The other ingredient being water and earth in combination to cover the waste products brought to the landfill and to compact it.

Present landfills have significant disadvantages because of the bulk size and the variety of materials that they are burying. One problem with prior art landfills is an uneven settlement of the surface of the fill. Such uneven settlement results in the landfill being unsuitable for certain types of uses such as structures bearing heavy loads on the fill. The uneven settlement is due from large objects, such as large solid waste products, deteriorating and decaying, leaving buried voids which in time collapse and cause uneven settlement and throughout the volume of the fill resulting in "cave-ins" at the finished surface of the landfill. Such prior art landfills are unable to support loads other than loads imposed by land uses such as parks and golf courses which can accommodate uneven differential settlement of the earth underneath. This condition is a limiting factor in the future use of these surface areas created by landfills.

Another problem with prior art landfills is ground water pollution from leachaids seeping through the volume of the landfill down into the water table. This seepage is a result of a prior art economic inability to remove liquids from all refuse brought to the site. As a result, ground water tables are becoming polluted thereby reducing the potable supply of water for consumption. This is an adverse environmental impact which, in the past, has stopped the location of landfills in sensitive areas, close to the center of population, where they are economically best located. This adverse impact continues from the present day to the future for generations to come. It can only be mitigated by removing moisture from the refuse before it is buried.

Additionally, prior art landfills suffer from the creation of methane gas. The decomposition of organic materials in bulk causes the creation of methane gas pockets which are nonuniform in size and location. Pockets of methane gas, when trapped in voids caused by deterioration, are forced to the surface when these voids collapse, causing unacceptable odors and dangers of explosion from contact with sparks produced by people or equipment using the surface of the landfill. The presence of such a danger is a further limiting factor in the use of landfill surface areas.

Another inhibiting factor in prior art landfills is the infestation of rodents who seek out garbage and live in voids caused by its decomposition and deterioration. These rodents come to the surface and their population increases in colonies tributary to landfills. When these colonies reach a certain size, they can no longer be sustained on the food by-products of the landfill. They then spread out into adjacent neighborhoods seeking food in inhabited areas and become a serous health hazard to human inhabitants.

Therefore, it is an object of the present invention to provide a method and an apparatus for waste disposal whereby all refuse is ground down to small uniform particles that can be evenly mixed with earth limiting bulk and resulting in a more even distribution of particles of refuse which will allow for an even settlement of landfill surface areas through a uniform compaction and dispersal allowing for a uniform compacted surface condition.

It is another object of the present invention to provide a method and an apparatus of waste disposal which significantly reduces and prevents moisture from seeping through the landfill to the water table.

It is yet another object of the present invention to provide a method and apparatus for waste disposal which limits the formation of methane gas.

It is yet another object of the present invention to provide a method and apparatus for waste disposal which limits rodent populations from infesting landfills.

It is yet another object of the present invention to provide a method and apparatus for waste disposal which permits the separation of smaller particles of uniform size into organic, inorganic, and other substances for recycling and reclamation purposes when it becomes economically desirable to do so. At that time, the incineration of refuse may be less onerous as the pollution emitting from burning may be controlled to a greater extent.

It is yet another object of the present invention to provide an efficient method of solid waste disposal which can accommodate high volume output.

SUMMARY OF THE PRESENT INVENTION

The present invention contemplates a multi-level collection area of solid waste products. On a top level of the collection site, ramp ways for trucks are provided so that the trucks may dump solid waste into a central collection opening. Gravity feeds the solid waste into a centrifugal spinner. The spinner includes radial agitator blades. The solid waste is spun and agitated on the spinner and centrifugal force tends to push the solid waste to the outer edge of the spinner. The spinner angles upward from the center to an outlet slot of uniform size disposed about the circumference of the spinner. A cover is disposed over the spinner having rows of cutting teeth in diminishing sizes, large at the center and reducing in proportion to the outside circumference where the teeth are similar in size to the desired particle size to be emitted through the slot disposed thereon. The combination of the cover and spinner is such that as larger pieces of solid waste are propelled towards the outlet slots, they are acted on both by the spinner and the cutting teeth of the cover, reducing them to a size small enough to fit through the outlet opening. The continuous rotating action also aids in preventing the clogging of the outlet opening. The centrifugal force of the spinner pushes the articles through the outlet slots and into a series of collection bins. The collection bins may include screens or filters for further controlling the size of the solid waste particles. Runways are provided beneath the bins for access by trucks. An opening in the bottom of the bin is used to release the small size solid waste particles into the truck for transportation to a landfill site. The uniform and small size of the solid waste particles results in uniform compaction with a minimum of settlement in the land fill, increasing the likelihood that the land fill will be suitable for uses requiring load support capabilities.

Moisture is removed from the processed solid waste by centrifugal force. The bottom of the storage bins is pitched and includes as sieve so that any liquid exiting the outlet slot will flow through the sieve and be transported away from solid waste. By substantially reducing the liquid content of the solid waste, the land fill volume will have fewer organic fluids and liquids, reducing the amount of leachaids. The mixing of the small and uniform particles containing some latent moisture with dry soil will cause that remaining moisture to be absorbed by the soil and as a result the moisture will be dissipated uniformly.

The reduction of the bulk of materials to a small uniform size will eliminate the burial of large objects in the fill. The small particles mixed with earth will allow a distribution of particles in a uniform manner throughout the entire landfill. The particles of small and uniform size will be encased by the earth and will become another aggregate substance such as small rocks and pebbles are often present in soil. This will eliminate voids where methane gas was allowed to form in the past.

The mixing of the small and uniform particles with earth will mix whatever food particles remain with soil to make those remaining food particles unpalatable to rodents. An example might be the mixing of say a breakfast cereal with sand. This composition may be palatable to some type of bugs but not to a mouse or rat.

The grinding of large objects into small and uniform particles will permit an easier separation of those particles through various existing and future methods of separating materials in water of other solutions. Present methods of reclamation and recycling materials are economically prohibitive for the value derived. The present invention will reduce those costs. It will also enable an easier separation of materials for purposes of incineration in lieu of burial in landfills.

BRIEF DESCRIPTION OF THE DRAWINGS

FIG. 4 is a reflected plan view of the cover of the present invention.

A METHOD AND APPARATUS FOR SOLID WASTE DISPOSAL IS DESCRIBED

Figure 1:
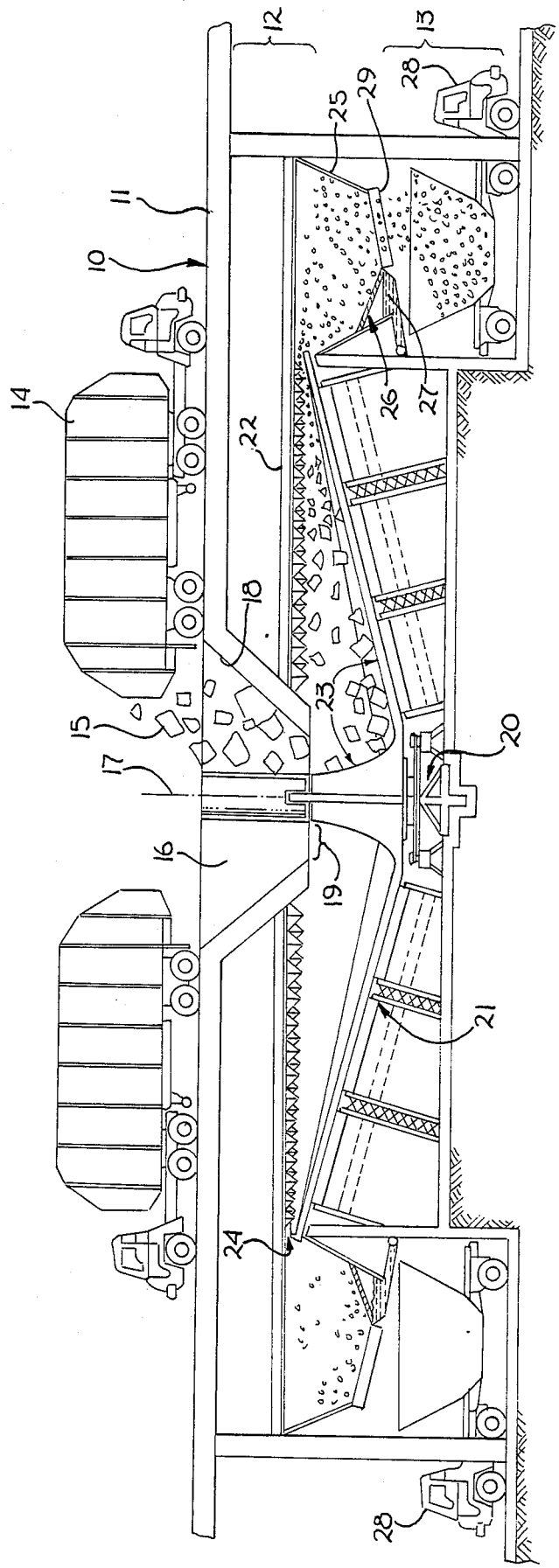
FIG. 1 is a cross sectional view illustrating the preferred embodiment of the present invention.

In the following description, numerous specific details are set forth in order to provide a more thorough understanding of the present invention. It will be obvious, however, to one skilled in the art, that the present invention may be practiced without these specific details. In other instances, well known features have not been described in detail in order not to unnecessarily obscure the present invention.

The present invention provides an efficient method and apparatus for solid waste disposal. The present invention provides a method for reducing the size of solid waste to a uniform size, and for separating liquid components from solid waste. The present invention also provides land fill material having uniform compaction capabilities and reduced effects from leachaids and methane gas formation. The collection center of the present invention is designed for high volume processing such that a single collection center of the present invention may replace a number of collection centers of prior art design. In addition, the multilevel design of the present invention permits gravity to be used to aid in sorting, transporting and separating solid waste materials. By using gravity in this manner, the number of moving parts is reduced and the energy efficiency of the present invention is increased.

In general, the present invention is a circular multilevel assembly for the collection, processing, loading and transportation of solid waste material. A large number of trucks, carrying solid waste such as garbage and other waste products, may be driven onto an unloading platform having a central opening therein. The trucks dump their solid waste materials into a collection opening where gravity causes the materials to flow to a collection and processing chamber below. The collection opening is circular and trucks access the opening in a radial direction so that a plurality of trucks may utilize the opening at the same time. A spinning shallow truncated cone disposed on a central shaft receives the solid waste and begins grinding and shredding it into smaller particles. The spinner has agitator blades disposed thereon and rotates so that centrifugal force forces the waste product to its outer circumference. A cover over the plate includes a plurality of steel teeth on the under side thereof so that as the waste particles approach the outer circumference of the disk, the particles are ground into smaller and finer sizes. An exit slot at the outer edge of the spinning plate feeds the ground up waste into a temporary storage bin. The floor of the storage bin is pitched and screened so that run off liquid may be removed from the solid waste particles. A door in the bottom of the storage bin allows access to the storage bin by transport trucks which are driven beneath the bins. A continuous number of bins are disposed in a circle about the grinding mechanism for continuous emission of smaller uniform particles. When reduced, these particles compact in a much smaller volume to that when they were brought in. This feature permits a high volume processing technique.

The preferred embodiment of the present invention is illustrated in FIG. 1. The collection center 10 of the present invention consists of three levels, 11, 12 and 13.

The top level 11 is for the unloading of trucks containing solid waste material. The second level 12 includes the processing mechanism to reduce the solid waste into uniform small particles. The lowermost level 13 is used for loading the processed solid waste into trucks for transportation to land fill sites or incinerators.

The top level 11 may be disposed at ground level, or above ground, with suitable reinforcing means to provide a platform capable of supporting large trucks. The top level consists of a large circular platform with an opening 16 in the center thereof. A plurality of trucks 14 may back up on the platform to the opening 16 to dump a load of solid waste 15 into the opening. The sides 18 of the opening 16 are sloped so that the waste 15 is directed to the bottom opening 19 and then to the processing area. The upper platform of the top level 11 may be poured concrete or any other suitable construction material capable of supporting the weight of a plurality of trucks carrying solid waste materials. In the preferred embodiment of the present invention, the upper platform is circular and has a diameter of approximately 120 feet and the central opening is approximately 29 feet in diameter.

The processing area consists essentially of a rotating plate 23 mounted on a shaft 17, and a cover 22. A motor 21 turns the shaft 17 and thereby turns the plate 23. In the preferred embodiment of the present invention, the plate is approximately 72 feet in diameter in the preferred embodiment and is anchored in the structure through an axle resting on a large bearing plate that distributes the weight over a sealed ball bearing anchor. The plate is constructed of a carbon steel skin covering a honeycomb core to reduce weight in the preferred embodiment of the present invention. The curvature of the plate past the bottom of opening 16 directs the waste dropping down away from the opening and onto the agitator blades which immediately act on the waste product. The top of the axle is held in the upper structure by bearings and a bushing cast in the center of the radial support beams (see FIG. 2). In the present invention, a variable speed motor drive, either electric or gas powered, is utilized to spin the plate 23 in either of a clockwise or counterclockwise direction. The plate 23 has formed on a surface thereof a plurality of radial blades and ridges for bouncing the waste against the teeth above. The agitator blades 31 are attached and a part of plate 23 and rotate with it and in the same direction. The plate 23 is pitched upward in a direction away from the central shaft. The outer edge of the plate 23 may include a "lip" or extending edge to further define the outlet opening between the plate and the cover.

A horizontal cover 22 is disposed over the plate 23. Due to the upward pitch of the plate 23, the space between the cover 22 and the plate 23 narrows as it approaches the counter circumference of the plate 23. This funnel effect is consistent with the net effect of the present invention. The spinning action and agitation of large waste particles entering at the center of the circle being ground and cut to smaller particles as they are forced up through smaller spaces and increasing numbers of diamond shaped cutting teeth combines the natural forces of gravity and centrifugal force with abrasion against numerous sharp teeth to essentially pulverize waste to the desired size. The cover 22 includes a plurality of diamond shaped cutting teeth attached to surface thereof to chop, tear, grind and shred the waste products. An opening 24 formed between the plate 23 and cover 22 divides the largest particle which may exit the existing stage of the present invention. Solid waste of a suitable size exits the opening 24 and falls into a storage bin 25.

The floor 26 of the storage bin 25 is pitched and screened so that water and other liquids 27 contained in the solid waste run off and are collected for disposal. The substantially dry solid waste in the storage bin 25 is of a uniform particle size. An opening 29 in the storage bin 25 in used to load trucks 28 with the processed waste particles, which are now suitable for land fill use or incineration. Because of the uniform size of the particles and lack of moisture, the processed solid waste of the present invention provides an ideal land fill material which allows for uniform compactness and reduced methane and leachaid formation.

Figure 2:
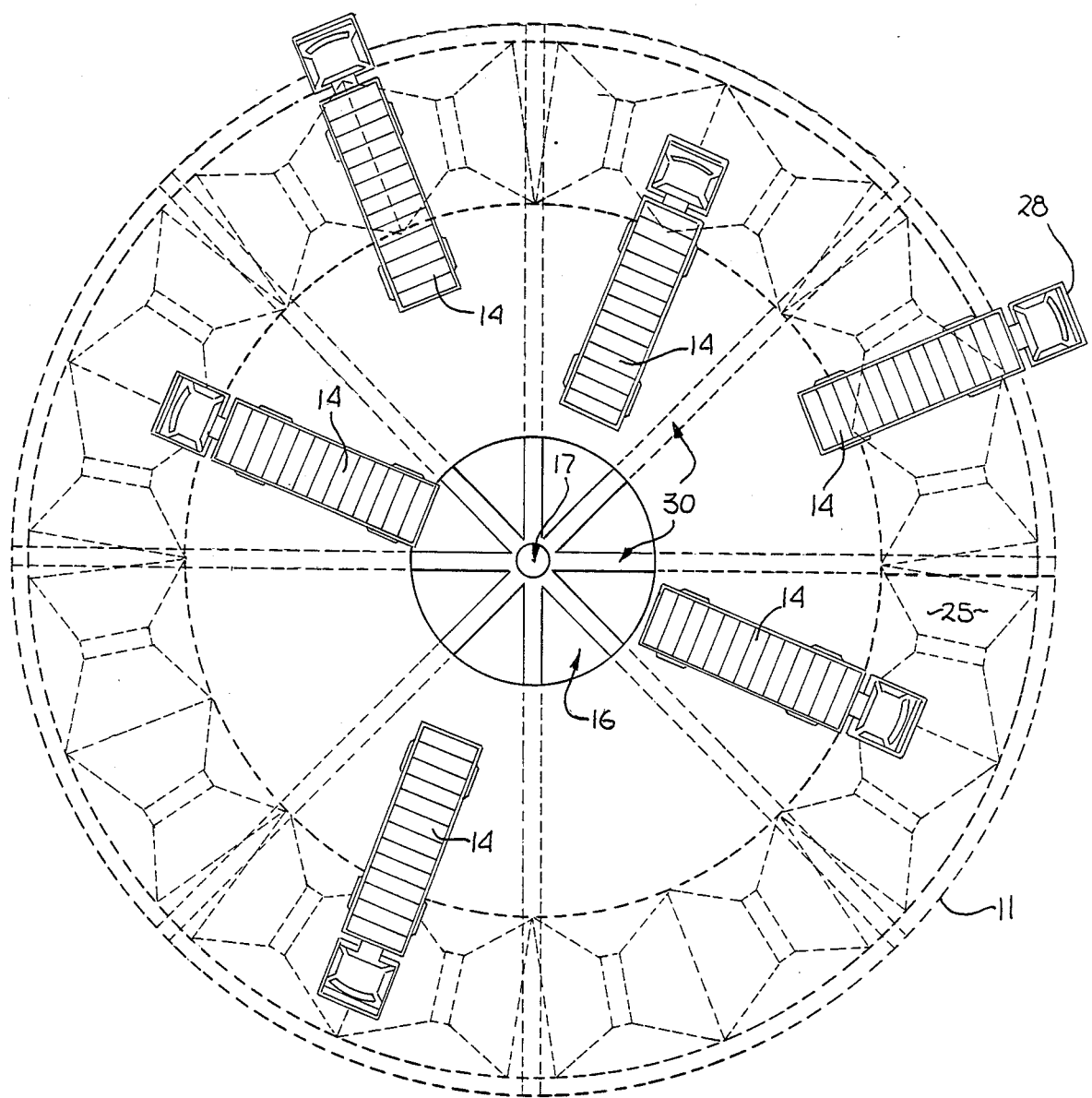
FIG. 2 is a top view of FIG. 1.

Referring now to FIG. 2, a plan view of the preferred embodiment of the present invention is illustrated. The upper level 11 of the present invention is substantially circular and supported by series of radial ribs 30 disposed about the central shaft 17. By positioning trucks in a radial direction on the upper level 11, a plurality of trucks may access the central opening 16 simultaneously, providing for more efficient operation of the present invention. A plurality of storage bins 25 are disposed in a circle about the present invention. The bins are substantially V shaped so that the processed solid waste is directed to opening 29 in the bottom of the bins 25. The multi level construction of the present invention allows trucks to drop off solid waste at the same time that trucks being loaded with processed solid waste are accessing the facility for removal of the processed waste particles. The geometry of the apparatus is such that at the outer circumference there is more area that at the central opening 16. In addition, the bins holding the smaller uniform particles of waste can and will accommodate much greater volumes of waste than those quantities being deposited at the center. Further, the removal of the liquid substances from the waste increases that volume held for disposal in the bins.

Figure 3:
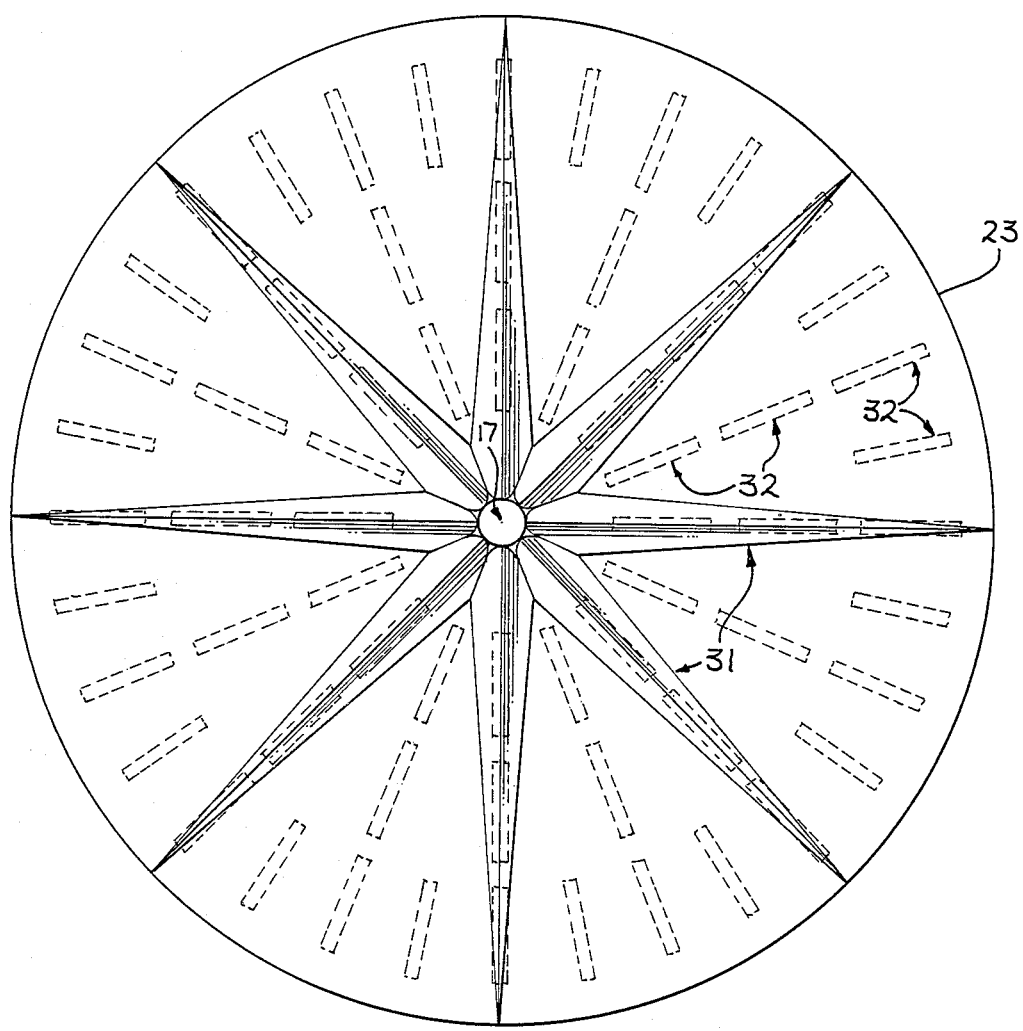
FIG. 3 is a plan view of the spinner of the present invention. invention.

The spinning plate 23 is illustrated in FIG. 3. The plate 23 is substantially circular and is disposed about the central shaft 17. The plate 23 has formed on the surface thereof a plurality of agitator blades 31 for bouncing the waste against the cutting teeth above hanging below the cover 22. In the preferred embodiment of the present invention, the agitator blades 31 are steel, but any suitable material may be utilized without departing from the scope of the present invention. Plate 23 is supported from beneath by a plurality of roller supports 32 spaced more or less uniformly to allow equal distribution and support of plate 23. In the preferred embodiment, the roller supports 32 are elongated cylinders that roll in place as the plate 23 turns above them. The rollers are removable for ease of replacement in the preferred embodiment of the present invention and are constructed of nylon or rubber. If desired, the support rollers 32 themselves may be motorized to aid in rotation of the plate 23. Any suitable bearing means may be utilized with the present invention.

The surface of the cover 22 is illustrated in FIG. 4. The cover 22 includes a plurality of teeth 33 to cut and reduce by grinding and shredding of waste in the processing chamber. Control opening 34 in the cover 22 is slightly larger than the opening 19 in the access opening of the present invention. As can be seen from FIG. 1, the side walls 18 of the access opening 16 extends slightly below the level of the cover 22. This aids in preventing clogging of the access opening and aids in preventing the waste particles from bouncing back out through access opening 16.

In operation, the spinner and agitator rotate and agitate the waste. The action of the agitator causes the solid waste to be bounced up against the steel teeth of the cover, cutting and tearing the waste and reducing the size to smaller particles, as the waste ascends the incline of the plate 23 ground down to the size desired. The centrifugal force of the spinning plate 23 pushes the solid waste particles to the outer circumference of the plate where they are continuously acted on by the combination of the agitator and the teeth of the cover 22. When the particles are smaller than the slot opening 24, they exit the spinner and are collected in a continuous series of steel bins 25 surrounding the circumference of the plate 23. As noted previously, moisture and other liquids are removed from the solid waste by filtering out the liquids in the storage bin 25. The removed fluids are carried away in a piping system to storage containers or for disposal in a waste water treatment plan. The result of the action of the present invention are particles of waste that will mix uniformly with earth permitting a more even compacted landfill capable of supporting greater loads on its surface than present sate-of-the-art landfills will allow. This will allow more flexibility and thus value to the surface area of the new landfill permitted by the present invention. At the same time making the new landfill much more tolerable in its environmental characteristics.

Thus an improved method and apparatus for solid waste disposal has been described.

We claim:

1. Apparatus for processing solid waste comprising:
   receiving means for receiving said solid waste, said receiving means comprising a circular platform having a receiving opening formed therein, said platform for access by transportation means for delivery of solid waste into said receiving opening;
   processing means adjacent said receiving means for reducing said solid waste to a plurality of uniformly sized particles, said processing means comprising a rotating plate disposed below said receiving opening such that solid waste introduced into said receiving opening is directed to said rotating plate, said processing means further including a cover disposed above said rotating plate, said processing means having at least one outlet opening formed therein, said outlet opening being approximately the same size as said uniformly sized particles such that a particle of a size greater than said uniform size is retained in said processing means;
   storage means coupled to said outlet opening for storing said uniformly sized particles;
   fluid removing means coupled to said storage means for removing fluid from said uniformly sized particles;
   a discharge opening formed in said storage means for removing said uniformly sized particles for transporting from said apparatus.

2. The apparatus of claim 1 wherein a plurality of agitator blades disposed on said rotating plate bounce waste against a plurality of cutting teeth mounted on the underside of said cover plate.

3. The apparatus of claim 2 wherein said cutting teeth are diamond shaped and comprised of steel.

4. The apparatus of claim 1 wherein said rotating plate has an outer circumference at a higher elevation than an inner circumference.

5. The apparatus of claim 4 wherein a space between said outer circumference and said cover defines said outlet opening.

6. The apparatus of claim 5 wherein said outlet opening is coincident with said outer circumference.

7. The apparatus of claim 1 wherein said storage means comprises a receptacle having a floor therein, said floor having a first pitched section.

8. The apparatus of claim 7 wherein said fluid removal means comprises a screen disposed in said first pitched section, said screen including a plurality of openings having a size less than said uniformly sized particles, said screen having a fluid flow system disposed therebelow for receiving said fluid and transporting said fluid away from said storage means.

9. A method of processing solid waste comprising the steps of:
   providing said solid waste to a grinding means comprising a rotating plate having a plurality of agitator blades formed thereon and a cover having a plurality of teeth formed thereon, said cover disposed adjacent said plate;
   grinding said solid waste in said grinding means and reducing the particle size of said solid waste;
   defining an outlet opening in said grinding means having a size approximately that of a desired particle size of said solid waste such that solid waste of said desired particle size is urged out said outlet opening;
   storing said solid waste of said desired particle size in a storage container;
   removing fluid from said solid waste stored in said container.

10. The method of claim 9 wherein said outlet opening is defined by the distance between an outer circumference of said plate and an outer circumference of said cover.

11. The method of claim 9 wherein said fluid is removed by providing a screen in a floor of said container, said screen having a plurality of openings formed therin, said plurality of openings having a size less than said desired size.

12. Apparatus for solid waste disposal comprising:
   a receiving platform having a first opening formed in the center thereof for introduction of said solid waste;
   a rotating plate disposed beneath said first opening having a plurality of agitator blades formed thereon, said agitator blades for bouncing solid waste introduced thereto against a plurality of teeth;
   a cover disposed above said rotating plate, said cover having a second opening formed therein and disposed coincident with said first opening, said cover having said plurality of teeth formed thereon for reducing the size of solid waste contacting said teeth;
   an outlet opening defined by the outer circumferences of said cover and said rotating plate, said outlet opening having approximately equal to said desired size;
   a storage container dispose adjacent said outlet opening for receiving solid waste of said desired particles size, said container having a plurality of openings formed in a bottom surface thereof for removal of fluid from said solid waste.

13. The apparatus of claim 12 wherein said plurality of openings have a size less than said desired size.

14. The apparatus of claim 12 wherein said rotating plate is higher at said outer circumference than at an inner circumference.

15. The apparatus of claim 12 wherein said receiving platform is comprised of concrete and can support the weight of a plurality of solid waste transport vehicles.

16. An apparatus for reducing solid waste to particles of substantially uniform size comprising:
 a loading platform for supporting vehicles containing solid waste, said loading platform having receiving means for receiving said solid waste unloaded from said vehicles;
 a circular shredding chamber communicating with said receiving means;
 a concave circular agitator plate concentric with said shredding chamber and supported for rotary motion therein;
 motive power means coupled to said circular agitator plate for imparting said rotary motion thereto such that said solid waste is propelled by centrifugal force towards an outer perimeter of said shredding chamber;
 a plurality of shredding teeth projecting into said shredding chamber;
 outlet means disposed at said outer perimeter of said shredding chamber for allowing particles of shredded waste having a predetermined maximum size to exit said shredding chamber;
 storage means communicating with said outlet means for collecting and storing said particles of shredded waste as they exit said shredding chamber; whereby said solid waste is shredded into particles of substantially uniform size within said shredding chamber and said particles are collected in said storage means for subsequent disposal.

17. The apparatus of claim 16 further comprising fluid removal means coupled to said storage means for removing fluid from said particles of shredded waste.

18. The apparatus of claim 17 wherein said storage means comprises a receptacle having a floor therein, said floor having a pitched section, and wherein said fluid removal means comprises a screen disposed in said pitched section, said screen having a plurality of openings substantially smaller than said predetermined maximum size, said screen having a fluid flow system disposed therebelow for receiving said fluid and transporting said fluid away from said storage means.

19. The apparatus of claim 17 wherein said agitator plate includes a plurality of agitator blades disposed thereon for propelling said solid waste against said shredding teeth.

20. The apparatus of claim 17 wherein said outlet means comprises a circumferential clearance slot between said chamber cover and said agitator plate.

21. The apparatus of claim 16 further comprising a cover over said shredding chamber and wherein said shredding teeth project from said cover.

22. The apparatus of claim 16 wherein said receiving means comprises a funnel-shaped opening in said loading platform generally concentric with said shredding chamber, thereby directing the solid waste into the shredding chamber and providing a vent for gases within said shredding chamber.

* * * * *

UNITED STATES PATENT AND TRADEMARK OFFICE
CERTIFICATE OF CORRECTION

PATENT NO. : 4,834,300

DATED : 5/30/89

INVENTOR(S) : Wojciechowski et al.

It is certified that error in the above-identified patent and that said Letters Patent is hereby corrected as shown below:

col. 01, line 12  delete "soild"        insert --solid--
col. 04, line 02  delete "invention."   (2nd occurrence)
col. 08, line 41  delete "therin"       insert --therein--

Signed and Sealed this

Twenty-ninth Day of October, 1991

Attest:

HARRY F. MANBECK, JR.

*Attesting Officer*                *Commissioner of Patents and Trademarks*